(12) United States Patent
Moore

(10) Patent No.: US 9,266,249 B1
(45) Date of Patent: Feb. 23, 2016

(54) WOOD CUTTING MACHINE

(71) Applicant: Harvey E. Moore, Kingdom City, MO (US)

(72) Inventor: Harvey E. Moore, Kingdom City, MO (US)

( * ) Notice: Subject to any disclaimer, the term of this patent is extended or adjusted under 35 U.S.C. 154(b) by 121 days.

(21) Appl. No.: 14/299,904

(22) Filed: Jun. 9, 2014

(51) Int. Cl.
*B27B 5/18* (2006.01)
*B27G 3/00* (2006.01)
*B23D 47/02* (2006.01)

(52) U.S. Cl.
CPC . *B27B 5/187* (2013.01); *B27G 3/00* (2013.01); *B23D 47/02* (2013.01); *Y10T 83/7734* (2015.04); *Y10T 83/7755* (2015.04); *Y10T 83/7763* (2015.04)

(58) Field of Classification Search
CPC ...... B27B 5/187; B27G 3/00; Y10T 83/7693; Y10T 83/7997; Y10T 83/8763; Y10T 83/778; Y10T 83/7763; Y10T 83/7726; Y10T 83/7772; Y10T 83/95; Y10T 83/7755; Y10T 83/7688
USPC ................ 83/435.11, 471.2, 483, 475, 476, 83/485–486.1, 471.3, 487–489, 425.3, 83/508.3; 144/286.1, 286.5
See application file for complete search history.

(56) References Cited

U.S. PATENT DOCUMENTS

| | | | | |
|---|---|---|---|---|
| 3,839,789 A * | 10/1974 | Valkosky | ............ | B23Q 9/0028 30/273 |
| 4,104,944 A * | 8/1978 | Janssen | .................... | B27B 7/04 83/291 |
| 4,133,237 A * | 1/1979 | Lewin | ................. | B23D 47/025 83/468.3 |
| 4,275,501 A * | 6/1981 | Haire | .................. | B23Q 9/0071 30/374 |
| 4,393,969 A | 7/1983 | Woell | | |
| 4,440,054 A * | 4/1984 | Elhaus | ................ | B23D 47/005 144/252.1 |
| 4,567,795 A * | 2/1986 | Pool | ...................... | B23D 45/10 83/17 |
| 4,885,967 A * | 12/1989 | Bell | ........................ | B27B 31/06 83/520 |
| 4,995,288 A * | 2/1991 | DellaPolla | ........... | B23D 45/024 83/471.3 |
| 5,046,391 A * | 9/1991 | Lewis | .................. | B23D 45/024 144/376 |
| 5,273,090 A * | 12/1993 | Klemma | .............. | B23Q 9/0085 144/134.1 |
| 5,394,781 A * | 3/1995 | Tsubai | ................. | B23D 45/021 83/449 |
| 5,664,612 A * | 9/1997 | Klemma | .............. | B23D 45/021 144/134.1 |
| 6,128,994 A * | 10/2000 | Phelps | ...................... | B27B 7/00 144/378 |
| 7,530,298 B2 * | 5/2009 | Peterson | ................. | B27B 5/207 144/378 |
| 7,555,976 B2 * | 7/2009 | Logan | .................... | B23D 47/02 144/286.5 |
| 7,686,045 B2 | 3/2010 | Garcia et al. | | |
| 8,276,493 B2 * | 10/2012 | Dale | ....................... | B23D 55/02 83/788 |
| 8,327,893 B2 | 12/2012 | Jesberger | | |

* cited by examiner

*Primary Examiner* — Laura M Lee
(74) *Attorney, Agent, or Firm* — Crossley Patent Law

(57) ABSTRACT

A wood cutting machine including a central track mounted on a quartet of end legs and a pair of height-adjustable center legs. Cross supports are attached to the central track. A frame, mounted on a pair of tracks disposed on the central track, includes a pair of saw blades mounted on a blade shaft axially attached to the frame via a pair of mounts. A motor housing is in operational communication with the frame and includes an internal motor, which is in operational communication with the blade shaft via a pair of pulleys and an attached belt. A pair of rollers, in operational communication with the frame, secure and stabilize a board placed on the central track, for cutting. The blades rotate and cut the wood as the frame is moved forward over the board.

8 Claims, 7 Drawing Sheets

WOOD CUTTING MACHINE

BACKGROUND OF THE INVENTION

Various types of wood cutting machines are in use and are known in the prior art. However, what is needed is a wood cutting machine that is adaptable and easy to use, but at the same time, has characteristics that have not yet been utilized or conceived as shown in the present invention. The present invention provides the strength and utility of a large wood cutting machine for individual or light business use, while at the same time, provides stability to a board being cut by holding the board in place without an individual having to personally hold the board. This characteristic provides extra safety measures combined with the ability to make clean and straight cuts.

FIELD OF THE INVENTION

The present invention relates to a wood cutting machine, and more particularly, to a wood cutting machine that provides features and characteristics above and beyond existing wood cutting machines that are presently available today. Although a wide variety of wood cutting machines exist, none combine ease of use with the safety of the present invention and the ability to effectively and quickly cut wood. The present invention is simple enough to be used for personal or business use but versatile enough that it can be used to cut wood in a variety of different lengths, shapes, and configurations.

SUMMARY OF THE INVENTION

The general purpose of the present wood cutting machine, described subsequently in greater detail, is to provide a wood cutting machine which has many novel features that results in a wood cutting machine which is not anticipated, rendered obvious, suggested, or even implied by prior art, either alone or in combination thereof.

The present invention disclosed herein is a wood cutting machine that is fabricated from a central track that is mounted on a quartet of end legs and a pair of center legs that are height-adjustable. A number of cross supports are in operational communication with the central track. A frame is mounted on a pair of tracks that are in operational communication with the central track, with the frame including a pair of saw blades mounted on a blade shaft that is axially attached to the frame via a pair of mounts. A motor housing is in operational communication with the frame and includes an internal motor, which is in operational communication with the blade shaft via a pair of pulleys and an attached belt. A pair of rollers in operational communication with the frame help push down and stabilize any piece of wood configured to be placed on the central track, which can then be cut by moving the frame forward over the piece of wood. The blades will rotate and cut the wood as the frame is moved over the piece of wood.

Thus has been broadly outlined the more important features of the present wood cutting machine so that the detailed description thereof that follows may be better understood and in order that the present contribution to the art may be better appreciated.

DETAILED DESCRIPTION OF THE DRAWINGS

Figure 1:
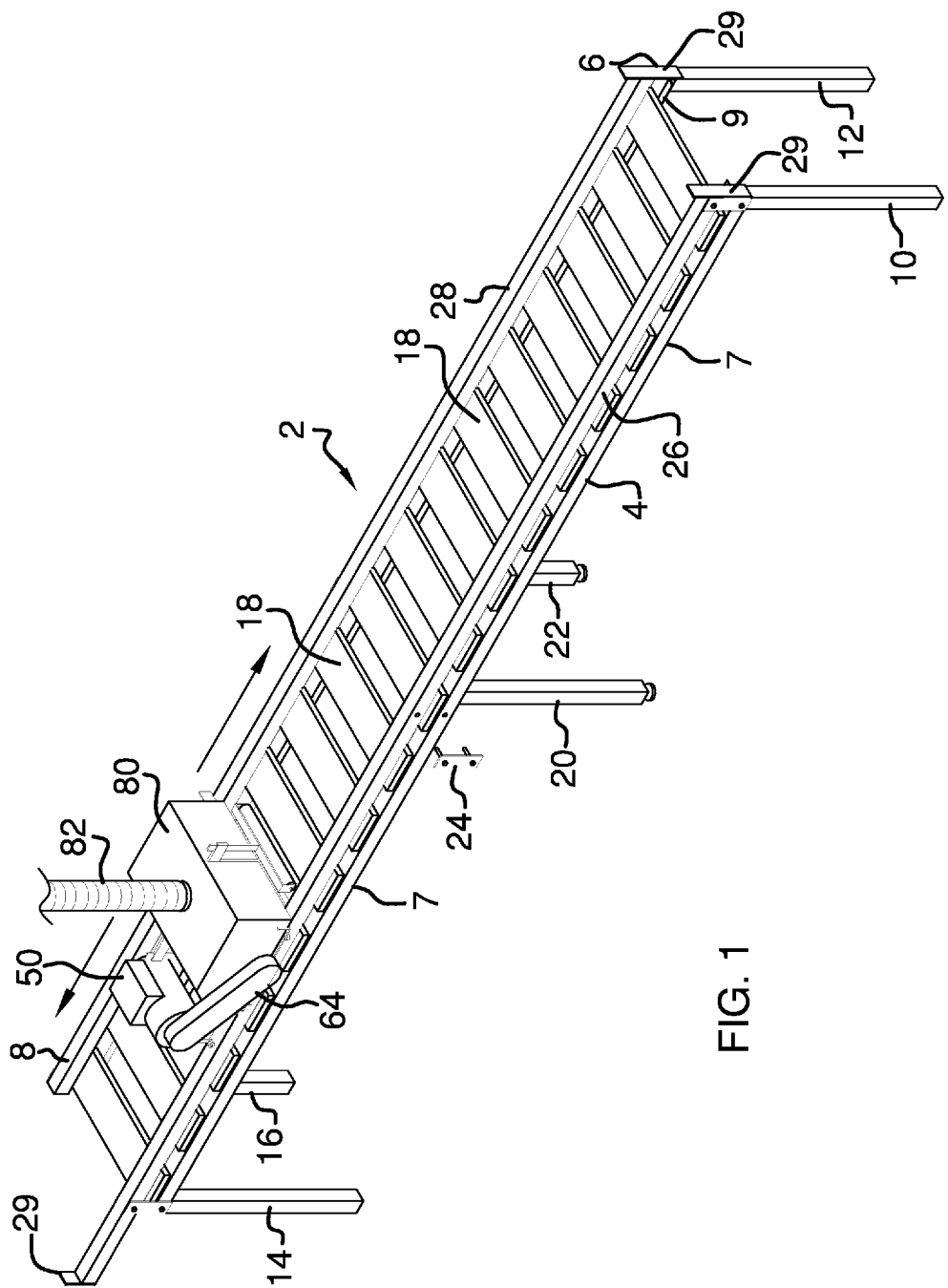
FIG. 1 is a top front perspective view.
Figure 2:
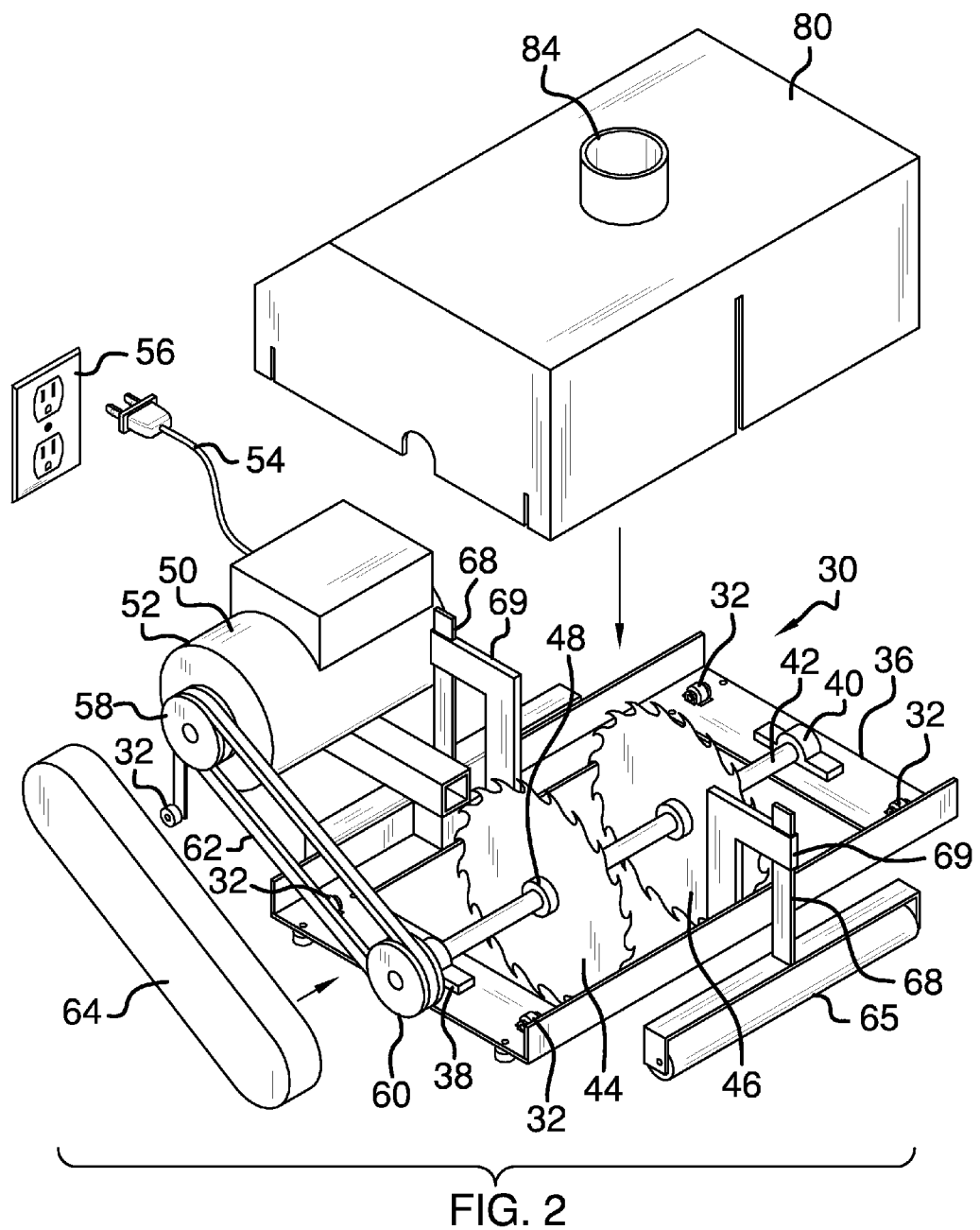
FIG. 2 is a perspective view of a blade mounting unit.
Figure 3:
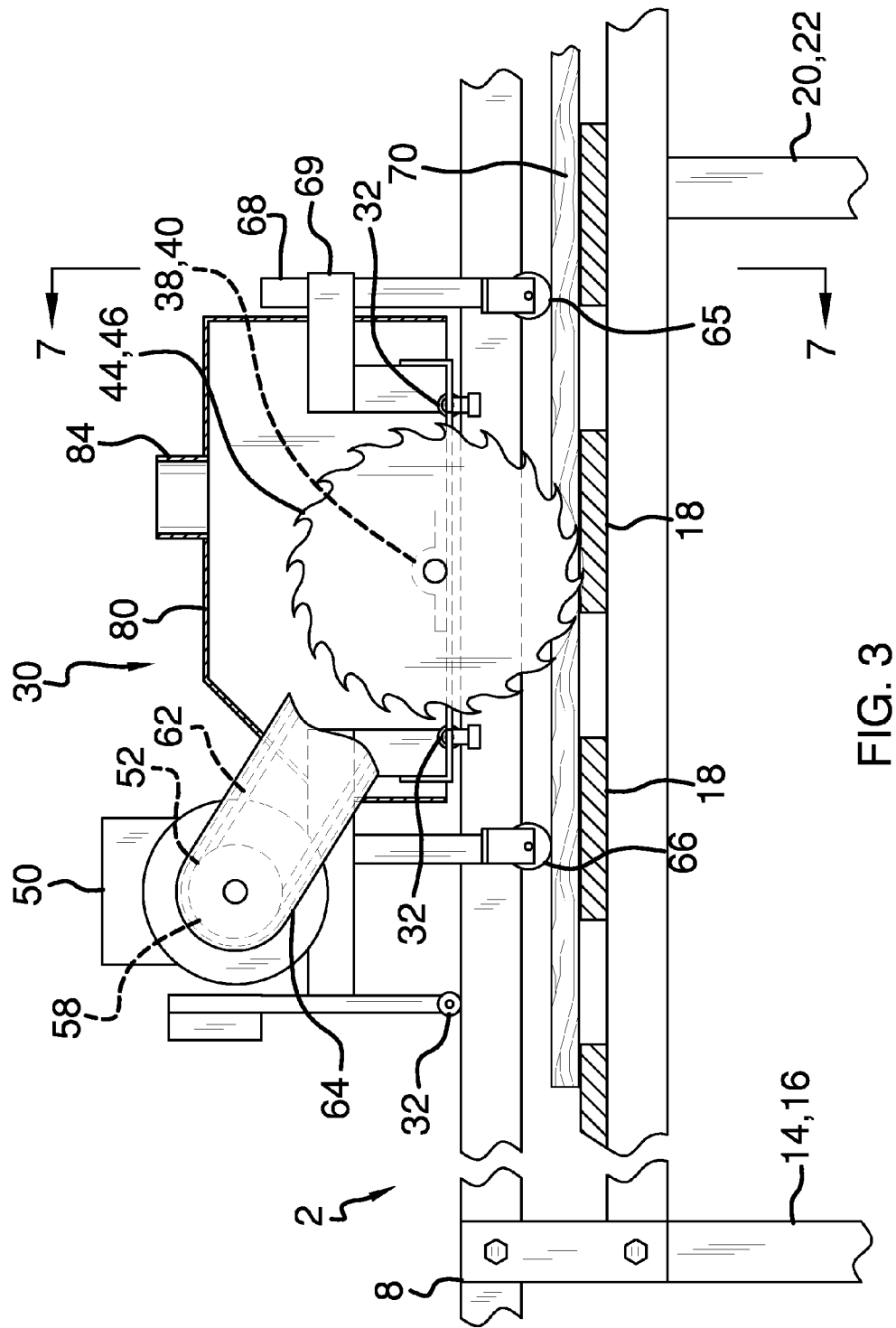
FIG. 3 is a side elevation view of the blade mounting unit.
Figure 4:
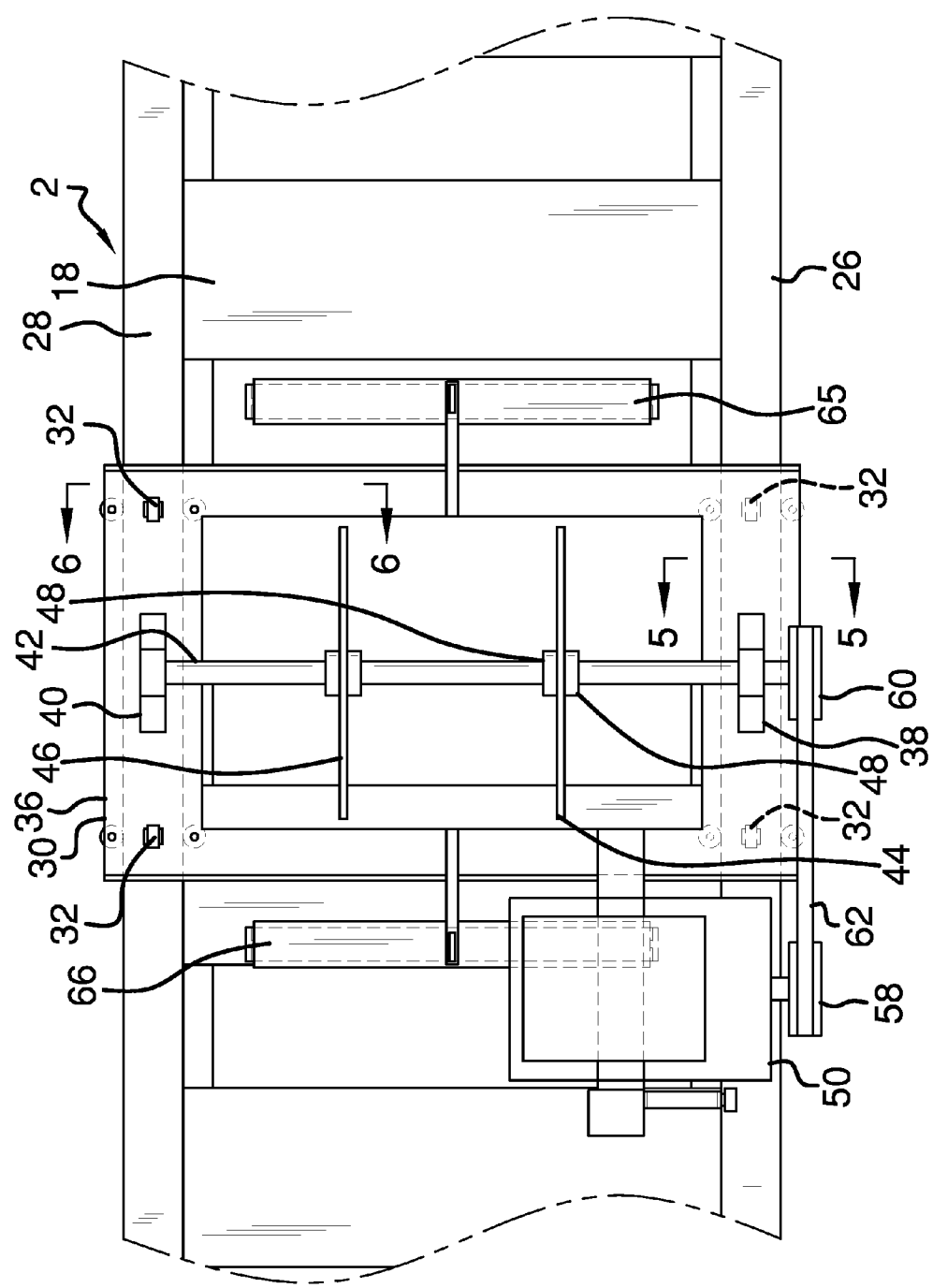
FIG. 4 is a top view of the blade mounting unit.
Figure 5:
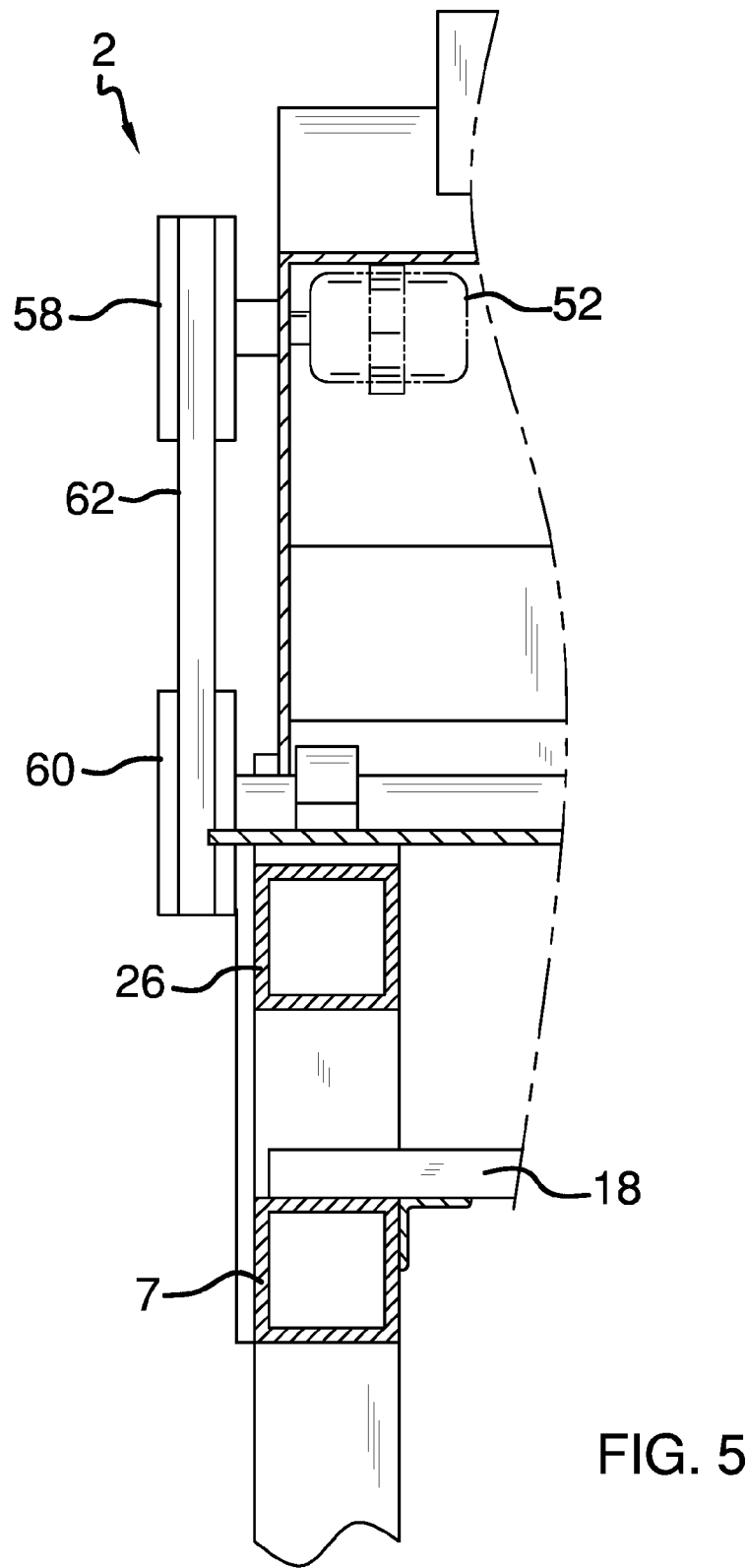
FIG. 5 is a cross-sectional view taken along line 5-5 of FIG. 4.
Figure 6:
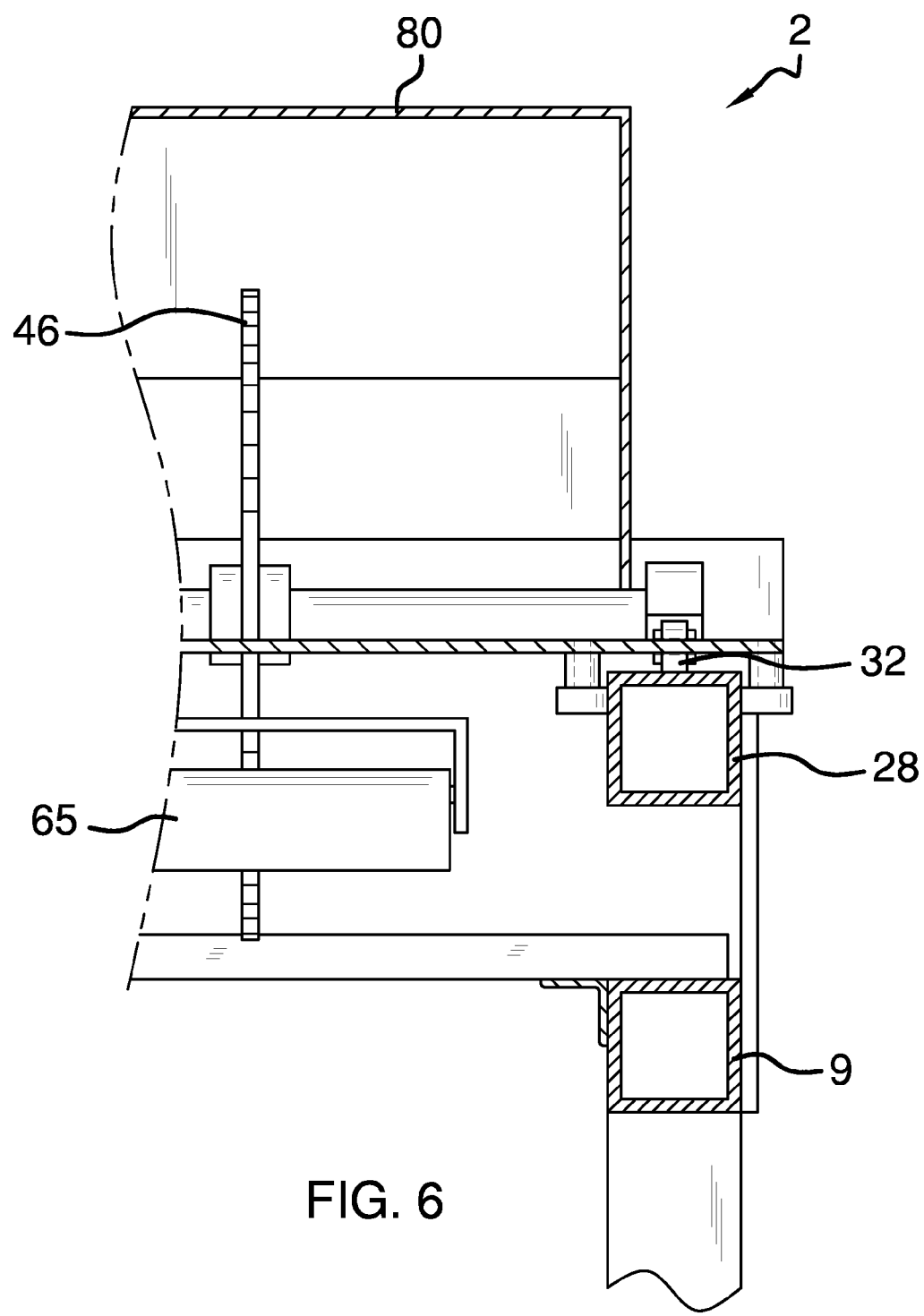
FIG. 6 is a cross-sectional view taken along line 6-6 of FIG. 4.
Figure 7:
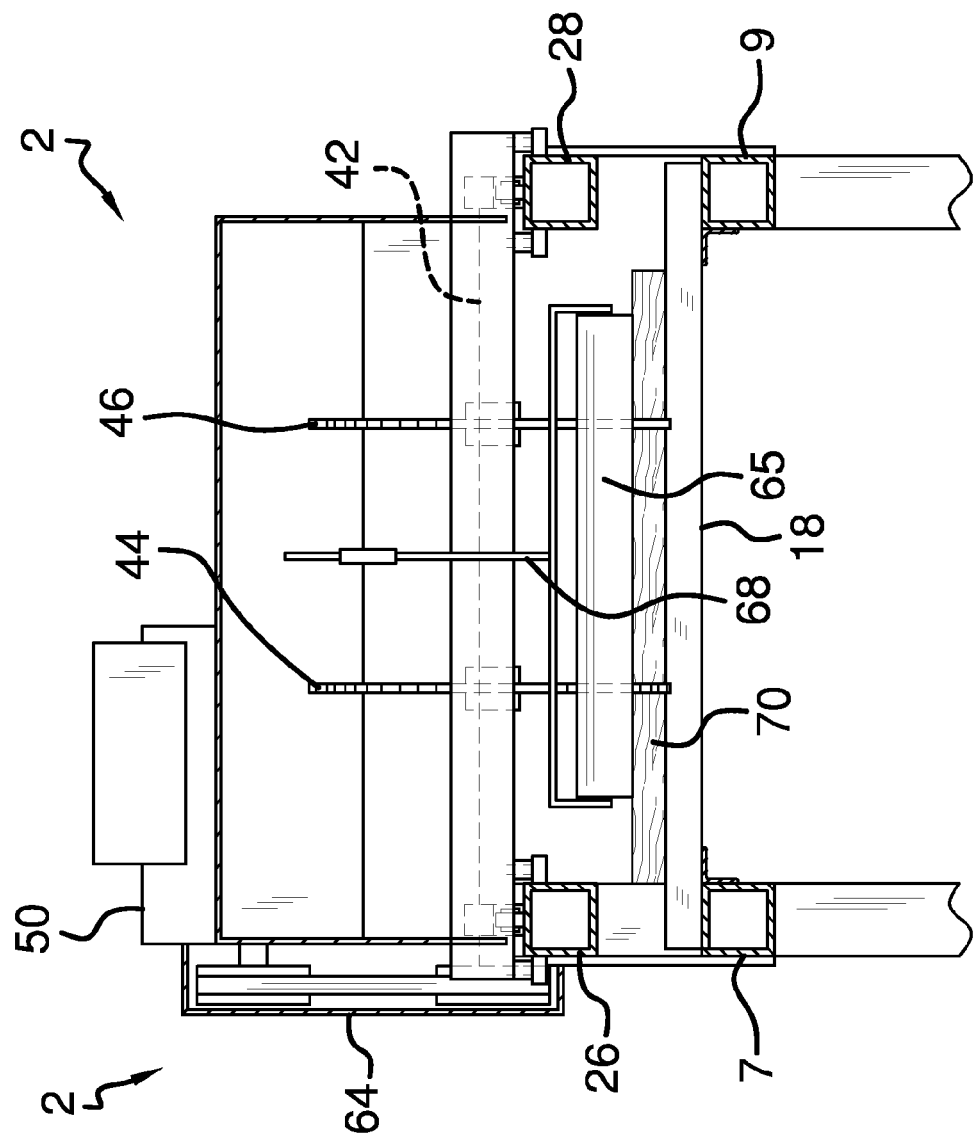
FIG. 7 is a cross-sectional view taken along line 7-7 of FIG. 3.

With reference now to the drawings, and in particular FIGS. 1 through 7 thereof, an example of the wood cutting machine employing the principles and concepts of the present invention and generally designated by the reference number 2 will be described.

Referring to FIGS. 1 through 7, a preferred embodiment of the present invention is disclosed. The wood cutting machine 2 disclosed herein includes a central track 4 having a first end 6 and a second end 8. The first end 6 of the central track 4 is attached to legs 10 and 12 and the second end 8 is attached to legs 14 and 16.

The central track 4 includes a left lower support 7 and a right lower support 9 attached lengthwise along the central track 4. The central track 4 has a plurality of cross supports 18 that run perpendicular to the length dimension of the central track 4 that provide extra support. Each of the cross supports 18 is attached atop the left lower support 7 and right lower support 9.

The wood cutting machine 2 also includes a pair of individually height adjustable center legs 20 and 22. Each of the center legs 20 and 22 is designed to be placed approximately halfway between the first end 6 and the second end 8 of the central track 4.

The central track 4 further includes a pair of tracks comprising a left track 26 and a right track 28. The left track 26 and the right track 28 are parallel to each other and are attached to the full length of the central track 4. Each of the left track 26 and the right track 28 is fixedly attached to the left lower support 7 and right lower support 9, respectively, by a separate bracket 24. The left track 26 and right track 28 are attached atop the cross supports 18 as well. A stop plate 29 is attached to each end of left track 26 and right track 28.

A blade mounting unit 30 is mounted atop the left track 26 and right track 28 by a plurality of runners 32. The blade mounting unit 30 includes a rectangular frame 36 that includes mounts 38 and 40, with blade shaft 42 being axially inserted into mounts 38 and 40. A pair of saw blades 44 and 46 are removably attached to the blade shaft 42 and are temporarily locked in place by the use of one or more lock collars 48, which are configured to be placed on each side of each saw blade 44, 46 to temporarily affix the respective saw blade in the desired spot on the blade shaft 42.

Motor housing 50 is also in operational communication with the frame 36, with motor housing 50 including an internal motor 52. Motor 52 is powered by a power cord 54 that is in operational communication with an external power source 56. Motor 52 is in operational communication with a first pulley 58 that is disposed outside the motor housing 50. A second pulley 60 is in operational communication with the blade shaft 42. A belt 62 connects the first pulley 58 to the second pulley 60. When the motor 52 is in operation, first pulley 58 and belt 62 causes second pulley 60 and blade shaft 42 to rotate as well.

A belt cover 64 is usually configured to be placed over the pulleys 58, 60 and the belt 62 when the wood cutting machine 2 is in use to minimize sawdust formation.

A pair of rollers 65, 66 are in operational communication with the frame 36 via an attached roller cam 68, with each roller cam 68 being inserted into a roller mount device 69. Two separate roller mount devices 69 are in operational communication with the rectangular frame 36 and each roller mount device 69 merely keeps a connection between a roller cam 68 and the rectangular frame 36, while the actual height of each roller 65, 66 in relation to the frame 36 or other objects of the present invention are determined by what each roller 65, 66 is resting upon.

In use, a board 70 to be laterally cut is placed on the central track 4 and a plurality of cross supports 18. Then, the roller 65 is adjusted for placement atop the board 70 and the blade mounting unit 30 is moved forward by hand, slowly along the length of the board 70. The saw blades 44, 46 will slowly cut lengthwise along the length of the board 70, while at the same time, rollers 65 and 66 will help to secure and affix the board 70 in a particular position to prevent movement while cutting the board 70. Rollers 65 and 66 operate primarily by the use of gravity and exert a slight downward pressure on the board 70 while the board 70 is being cut.

In use, a safety shield 80 is preferably configured to be placed over the frame 36 while the wood cutting machine 2 is in use. A ventilation hose 82 is in operational communication with the safety shield 80 via a hose connection 84. The ventilation hose 82 preferably removes air and wood debris on a continuous basis while the wood cutting machine 2 is in use.

The invention claimed is:

1. A wood cutting machine comprising:
   a central track having a first end and a second end, the central track comprising
      a left lower support and a right lower support, each of the left lower support and right lower support attached lengthwise along the central track;
      a plurality of cross supports attached to the central track, wherein each of these cross supports is placed atop the left lower support and right lower support;
   a quartet of end legs comprising a first leg, second leg, a third leg, and a fourth leg, wherein the first leg and the second leg of the quartet of end legs are attached to the first end of the central track, wherein the third leg and the fourth leg of the quartet of end legs are attached to the second end of the central track;
   a pair of center legs comprising a first center leg and a second center leg, wherein each of the first and the second center legs is attached to the central track approximately halfway between the first end and the second end of the central track;
   a pair of tracks comprising a left track and a right track, the left track being fixedly attached to the left lower support by a first bracket; the right track being fixedly attached to the right lower support by a second bracket; wherein each track of the pair of tracks are parallel to each other; wherein the left track and right track are attached atop the plurality of cross supports; wherein each of the left track and the right track has a stop plate attached thereto;
   a blade mounting unit mounted atop each track of the pair of tracks, the blade mounting unit comprising
      a rectangular frame;
      a pair of mounts comprising a first mount and a second mount, wherein each mount of the pair of mounts is in operational communication with the rectangular frame;
      a blade shaft axially inserted into each mount of the pair of mounts;
      a pair of saw blades comprising a first saw blade and a second saw blade, wherein each saw blade of the pair of saw blades is removably attached to the blade shaft;
      a motor housing in operational communication with the rectangular frame;
      a motor disposed within the motor housing;
      a power cord in operational communication with the motor;
      an external power source, wherein the power cord is in operational communication with the external power source;
      a pair of pulleys comprising a first pulley and a second pulley, wherein the first pulley is in operational communication with the motor and is disposed outside the motor housing, wherein the second pulley is in operational communication with the blade shaft;
      a belt in operational communication with the first pulley and the second pulley;
   a pair of rollers comprising a first roller and a second roller, wherein each roller of the pair of rollers is in operational communication with the rectangular frame;
   a safety shield configured to be placed over the rectangular frame;
   wherein the central track and the plurality of cross supports are configured to support a board;
   wherein each roller is configured to adjust for placement atop the board;
   wherein the blade mounting unit is configured to be manually moved forward
   wherein each of the rollers is configured to assist in securing the board to allow each of the saw blades to cut the board lengthwise as the blade mounting unit is moved forward.

2. A wood cutting machine according to claim 1 further comprising:
   a pair of roller cams, wherein each roller cam is in operational communication with a roller;
   a pair of roller mount devices, wherein each roller mount device is in operational communication with the frame, wherein each roller mount device is in operational communication with a roller cam.

3. A wood cutting machine according to claim 2 further comprising:
   a plurality of runners, wherein each runner is in operational communication with the rectangular frame;
   wherein the runners are configured to be placed atop the left track and the right track of the pair of tracks to properly mount the rectangular frame.

4. A wood cutting machine according to claim 3 further comprising:
   a plurality of lock collars;
   wherein each lock collar is configured to be placed adjacent to each saw blade to temporarily affix the respective saw blade into a specific spot on the blade shaft.

5. A wood cutting machine according to claim 4 further comprising:
   a hose connection in operational communication with the safety shield; and
   a ventilation hose in operational communication with the hose connection.

6. A wood cutting machine according to claim 5 further comprising:
   a belt cover;
   wherein the belt cover is configured to be placed over the belt when the wood cutting machine is in use; and wherein the belt cover is configured to be placed over each pulley of the pair of pulleys when the wood cutting machine is in use.

7. A wood cutting machine according to claim 6 wherein each of the center legs are height adjustable.

8. A wood cutting machine comprising:
a central track having a first end and a second end, the central track comprising
  a left lower support and a right lower support, each of the left lower support and right lower support attached lengthwise along the central track;
  a plurality of cross supports attached to the central track, wherein each of these cross supports is placed atop the left lower support and right lower support;
a quartet of end legs comprising a first leg, second leg, a third leg, and a fourth leg, wherein the first leg and the second leg of the quartet of end legs are attached to the first end of the central track, wherein the third leg and the fourth leg of the quartet of end legs are attached to the second end of the central track;
a pair of center legs comprising a first center leg and a second center leg, wherein each of the first and the second center legs is attached to the central track approximately halfway between the first end and the second end of the central track;
a pair of tracks comprising a left track and a right track, the left track being fixedly attached to the left lower support by a first bracket; the right track being fixedly attached to the right lower support by a second bracket; wherein each track of the pair of tracks are parallel to each other; wherein the left track and right track are attached atop the plurality of cross supports; wherein each of the left track and the right track has a stop plate attached thereto;
a blade mounting unit mounted atop each track of the pair of tracks, the blade mounting unit comprising
  a rectangular frame;
  a plurality of runners, wherein each runner is in operational communication with the rectangular frame, wherein the runners are configured to be placed atop the left track and the right track of the pair of tracks to properly mount the rectangular frame;
  a pair of mounts comprising a first mount and a second mount, wherein each mount of the pair of mounts is in operational communication with the rectangular frame;
  a blade shaft axially inserted into each mount of the pair of mounts;
  a pair of saw blades comprising a first saw blade and a second saw blade, wherein each saw blade of the pair of saw blades is removably attached to the blade shaft;
  a plurality of lock collars, wherein each lock collar is configured to be placed adjacent to each saw blade to temporarily affix the respective saw blade into a specific spot on the blade shaft;
  a motor housing in operational communication with the rectangular frame;
  a motor disposed within the motor housing;
  a power cord in operational communication with the motor;
  an external power source, wherein the power cord is in operational communication with the external power source;
  a pair of pulleys comprising a first pulley and a second pulley, wherein the first pulley is in operational communication with the motor and is disposed outside the motor housing, wherein the second pulley is in operational communication with the blade shaft;
  a belt in operational communication with the first pulley and the second pulley;
  a belt cover, wherein the belt cover is configured to be placed over the belt when the wood cutting machine is in use, wherein the belt cover is configured to be placed over each pulley of the pair of pulleys when the wood cutting machine is in use;
  a pair of rollers comprising a first roller and a second roller, wherein each roller of the pair of rollers is in operational communication with the rectangular frame;
  a pair of roller cams, wherein each roller cam is in operational communication with a roller;
  a pair of roller mount devices, wherein each roller mount device is in operational communication with the frame, wherein each roller mount device is in operational communication with a roller cam; a safety shield
  configured to be placed over the rectangular frame;
  a hose connection in operational communication with the safety shield; and
  a ventilation hose in operational communication with the hose connection;
wherein the central track and the plurality of cross supports are configured to support a board;
wherein each roller is configured to adjust for placement atop the board;
wherein the blade mounting unit is configured to be manually moved forward and
wherein each of the rollers is configured to assist in securing the board to allow each of the saw blades to cut the board lengthwise as the blade mounting unit is moved forward.

* * * * *